United States Patent
Cheng

(10) Patent No.: US 8,099,535 B2
(45) Date of Patent: Jan. 17, 2012

(54) METHOD FOR CONVERTING A KVM SYSTEM

(75) Inventor: Ching-Wei Cheng, Keelung (TW)

(73) Assignee: Action Star Enterprise, Co. Ltd., Taipei (TW)

( * ) Notice: Subject to any disclaimer, the term of this patent is extended or adjusted under 35 U.S.C. 154(b) by 16 days.

(21) Appl. No.: 12/544,228

(22) Filed: Aug. 20, 2009

(65) Prior Publication Data

US 2010/0064075 A1 Mar. 11, 2010

Related U.S. Application Data

(60) Provisional application No. 61/095,390, filed on Sep. 9, 2008.

(51) Int. Cl.
*G06F 13/12* (2006.01)

(52) U.S. Cl. ............................... 710/62; 710/73

(58) Field of Classification Search .............. 710/36–38, 710/51, 62, 63, 72–73; 345/157–158, 163, 345/167, 173
See application file for complete search history.

(56) References Cited

U.S. PATENT DOCUMENTS

| 6,295,051 | B1 * | 9/2001 | Kanevsky et al. | 345/163 |
| 6,708,228 | B1 * | 3/2004 | Meyers et al. | 710/5 |
| 7,240,111 | B2 * | 7/2007 | VanHarlingen et al. | 709/224 |
| 7,545,361 | B2 * | 6/2009 | Erickson | 345/156 |
| 2006/0146491 | A1 * | 7/2006 | Chen | 361/683 |
| 2007/0257883 | A1 * | 11/2007 | Ke | 345/157 |
| 2008/0307119 | A1 * | 12/2008 | Huang | 710/18 |
| 2009/0077282 | A1 * | 3/2009 | Hsueh | 710/63 |

* cited by examiner

*Primary Examiner* — Chun-Kuan Lee
*Assistant Examiner* — David Martinez

(57) ABSTRACT

A method for converting a KVM system comprising the steps of: (1) initializing a mouse device, at least two computer hosts, a keyboard, and at least two corresponding displaying device; (2) selecting which computer host and a corresponding displaying device are needed to be operated, then switching to the selected computer host and the corresponding displaying device by controlling a switch disposed on the mouse into a particular direction; (3) operating the selected computer host and the corresponding displaying device; (4) finishing the operation; (5) judging whether one of the computer hosts and another corresponding displaying device is needed to be operated, if yes, going to step (2), if no, going to next step; and (6) end.

10 Claims, 2 Drawing Sheets

METHOD FOR CONVERTING A KVM SYSTEM

CROSS REFERENCE TO RELTED APPLICATIONS

This application claims priority from a U.S. Provisional Patent Application Ser. No. 61/095,390 filed Sep. 9, 2008, the entire content of which is incorporated herein by reference.

BACKGROUND OF THE INVENTION

1. Field of the Invention

The present invention generally relates to a method for converting a keyboard/video/mouse (KVM) or a keyboard/mouse (KM) system, more particularly to a method which uses a switching and mouse device to interface in a KVM or KM system.

2. Description of the Prior Art

In the field of a prior KVM system, some basic devices are included. The devices are at least one converter, at least two computer hosts, a keyboard, at least two corresponding displaying device. Hence, while a user interfaces between the two computer hosts, the converter is the role of switching different operation frames of the computer hosts. So that the user must use the converter before changing the operation frames. Obviously, the procedures are complicate and lots of electrical lines should be connected to such devices. Therefore, a terrible mess happens due to the electric lines. For solving problems above, a keyboard/video/mouse (KVM) switch is a device that is generally connected to multiple computers in order to enable a single keyboard, video monitor and mouse to control each of the connected computers. In this way, a user may have access to multiple computers without having to invest in corresponding keyboards, monitors, and mice for each of the computers for reducing the electrical lines. Similarly, a keyboard/mouse (KM) switch can also reduce the electrical lines.

No matter the KVM switch or KM switch, there are two ways for switching the control right from one computer host to another. The first way is to activate a button disposed on the KVM/KM switch for hardware switching the control right; the second way is to move the cursor on the corresponding displaying device to a particular icon for software switching the control right. However, in the first way, users should move their sights to find the button disposed on the KVM/KM switch and activate it for hardware switching the control right. If users need to switch the control right frequently, it's not convenient for use. In the second way, the particular icon is too small to click accurately. Users may click on other icons adjacent to the particular icon because the cursor does not align on the particular icon.

It is desirable, therefore, to provide a method for converting KVM/KM system that has an intuitive user interface to allow for switching the control right of plurality computer hosts easily.

SUMMARY OF THE INVENTION

The primary objective of the present invention is to provide a method for converting a KVM/KM system. The method is to use a mouse with a switching function in order to switch a KVM/KM system. That is, the whole steps for converting the KVM/KM system will be reduced, and the whole devices of the KVM/KM system will be reduced either, so that an operator will be easier to have conversions among the devices of the KVM system.

A method for converting a KVM system comprising the steps of: (1) initializing a mouse device, at least two computer hosts, a keyboard, and at least two corresponding displaying device; (2) selecting which computer host and a corresponding displaying device are needed to be operated, then switching to the selected computer host and the corresponding displaying device through the switching and mouse device by controlling a switch disposed on the mouse into a particular direction; (3) operating the selected computer host and the corresponding displaying device; (4) finishing the operation; (5) judging whether one of the computer hosts and another corresponding displaying device is needed to be operated, if yes, going to step (2), if no, going to next step; and (6) end.

Another method for converting a KM system comprising the steps of: (1) initializing a mouse device, at least two computer hosts, a keyboard, and a displaying device; (2) selecting which computer host is needed to be operated, then switching to the selected computer host through the switching and mouse device by controlling a switch disposed on the mouse into a particular direction; (3) operating the selected computer host; (4) finishing the operation; (5) judging whether one of the computer hosts is needed to be operated, if yes, going to step (2), if no, going to next step; and (6) end.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

The details and technology of the present invention are described below with reference to the accompanying drawings:

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE PREFERRED EMBODIMENTS

Figure 1:
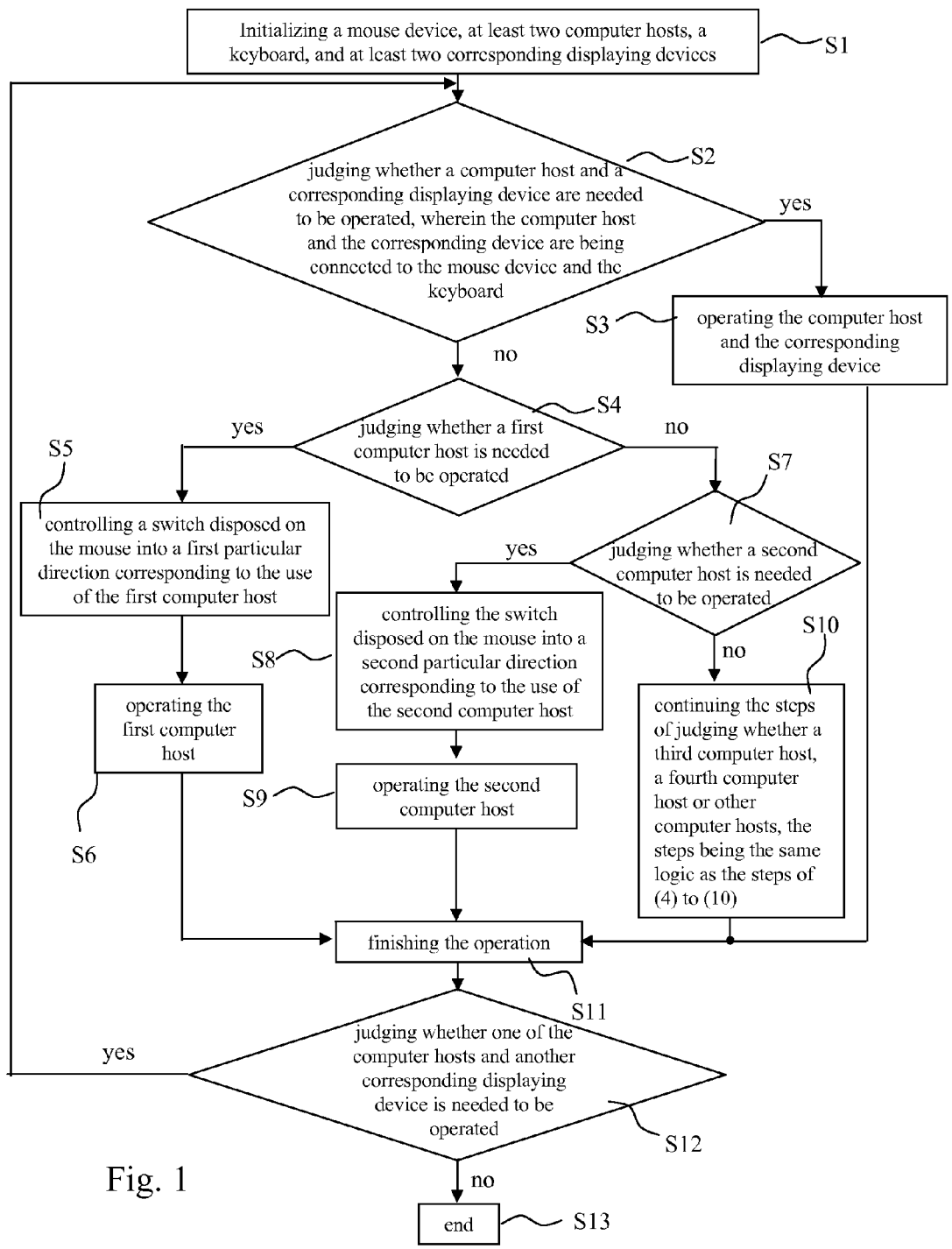
FIG. 1 illustrates a flow chart of the method for converting a KVM system of the present invention.

With reference to FIG. 1, which illustrates a flow chart of the method for converting a KVM system of the present invention. The method includes following steps: Initializing a switching and mouse device, at least two computer hosts, a keyboard, and at least two corresponding displaying devices (S1). Video signals from the two computer hosts will be displayed on the corresponding displaying devices, respectively. An operator can control one of the computer hosts from the switching and mouse device, the keyboard and the corresponding displaying device. The operator is then judging whether a computer host and a corresponding displaying device are needed to be operated, wherein the computer host and the corresponding displaying device are being connected to the switching and mouse device and the keyboard (S2). If one computer host and a corresponding displaying device are needed to be operated, the operator can continuously operate the computer host and the corresponding displaying device. After finishing the operating, it goes to step (S11). If none of the computer hosts needed to be operated, then going to step (S10). The method will then judge whether a first computer host is needed to be operated (S4), if yes, going to step (S5), if no, going to step (S7). Step (S5) controls a switch disposed on the mouse into a first particular direction corresponding to the use of the first computer host, and the operator can operate the first computer host (S6), then going to step (S11). Step (S7) judges whether a second computer host is needed to be operated, if yes, going to step (S8), if no, going to step (S10). Step (S8) controls the switch disposed on the mouse into a second particular direction corresponding to the use of the second computer host, and the operator can operate the second computer host (S9), then going to step (S11). Step (S10) is to continue the steps of judging whether a third computer host, a fourth computer host, or other computer hosts, the steps being the same logic as the steps of (S4) to (S10), then going to step (S11). Step (S11) is to finish the operation. Step (S12) judges whether one of the computer hosts and another corresponding displaying device is needed to be operated, if yes, going to step (S4), if no, going to step (13). Step (S13) is the end.

Moreover, the switch disposed on the mouse is a scrolling ball, a scrolling reel or a scrolling plate for change the direction by the operator.

The operator can control the direction of the switch disposed on the mouse for controlling which computer host and corresponding displaying device will be controlled by the mouse and keyboard.

Figure 2:
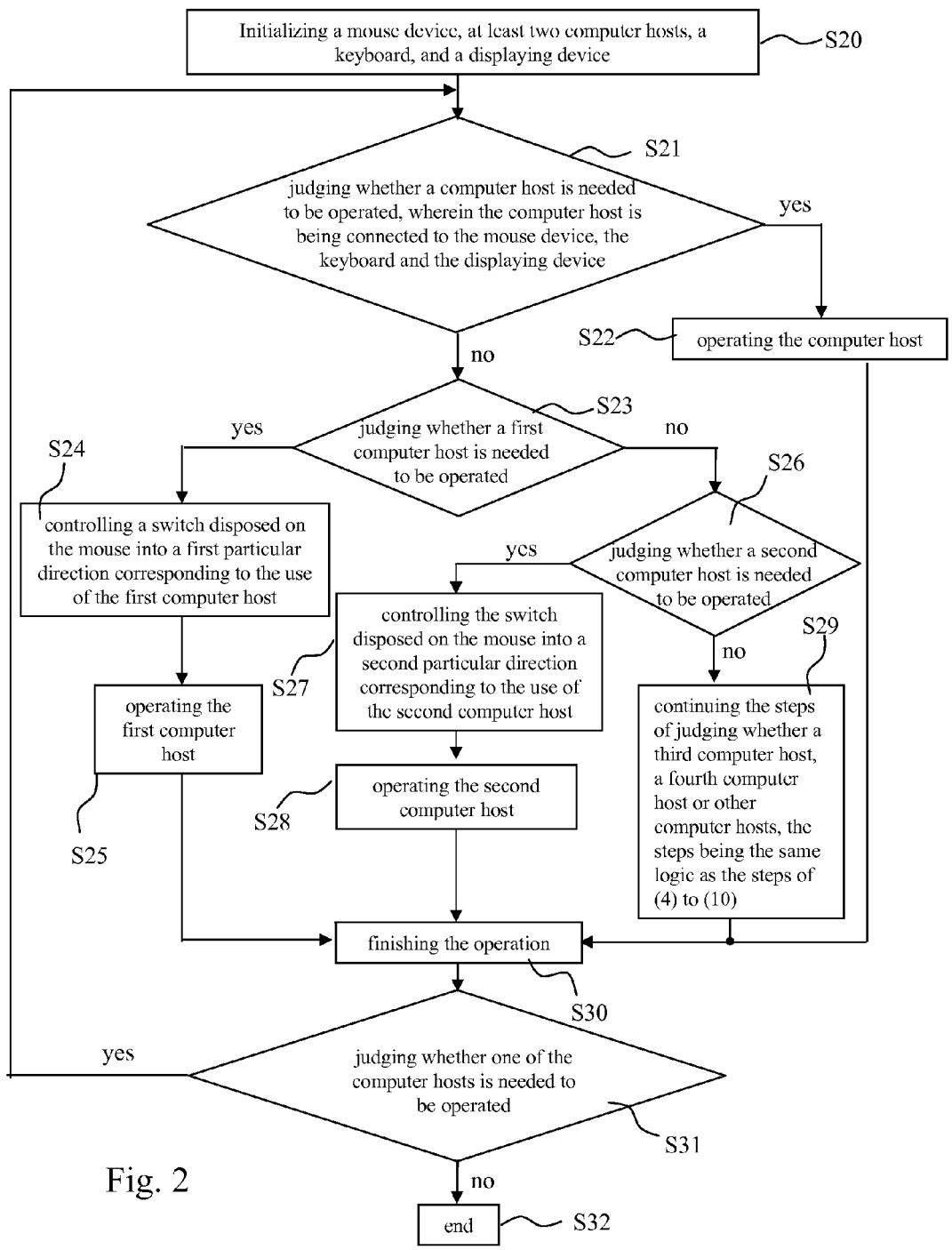
FIG. 2 illustrates a flow chart of the method for converting a KM system of the present invention.

With reference to FIG. 2, which illustrates a flow chart of the method for converting a KM system of the present invention. The method includes following steps: Initializing a switching and mouse device, at least two computer hosts, a keyboard, and a displaying device (S20). Video signals from the two computer hosts will be displayed on the displaying device. An operator can control one of the computer hosts from the switching and mouse device, the keyboard and the displaying device. The operator is then judging whether a computer host is needed to be operated, wherein the computer host is being connected to the switching and mouse device, the keyboard and the displaying device (S21). If one computer host is needed to be operated, then continuously operating the computer host. After finishing the operating, it goes to step (S30). If none of the computer hosts needed to be operated, then going to step (S29). The method then will judge whether a first computer host is needed to be operated (S23), if yes, going to step (S24), if no, going to step (S26). Step (S24) controls a switch disposed on the mouse into a first particular direction corresponding to the use of the first computer host, and the operator can operate the first computer host (S25), then going to step (S30). Step (S26) judges whether a second computer host is needed to be operated, if yes, going to step (S27), if no, going to step (S29). Step (S27) controls the switch disposed on the mouse into a second particular direction corresponding to the use of the second computer host, and the operator can operate the second computer host (S28), then going to step (S30). Step (S30) is to continue the steps of judging whether a third computer host, a fourth computer host, or other computer hosts, the steps being the same logic as the steps of (S23) to (S29), then going to step (S30). Step (S30) is to finish the operation. Step (S31) judges whether one of the computer hosts is needed to be operated, if yes, going to step (S23), if no, going to step (32). Step (S32) is the end.

Moreover, the switch disposed on the mouse is a scrolling ball, a scrolling reel or a scrolling plate for change the direction by the operator.

The operator can control the direction of the switch disposed on the mouse for controlling which computer host will be controlled by the mouse, the keyboard and the displaying device.

The present invention discloses a concept of using a mouse with a switching function in order to switch a KVM system, which has a mouse device with a switch, at least two computer hosts, a keyboard, and at least two corresponding displaying device. It is to benefit a user who is operating the KVM system. The present invention further discloses a concept of using a mouse with a switching function in order to switch a KM system, which has a mouse device with a switch, at least two computer hosts, a keyboard, and a displaying device. It is also to benefit a user who is operating the KM system.

No matter a KVM system or a KM system, it is easy to change the direction disposed on the mouse for converting the control right of a plurality computer hosts. For an operator speaking, converting the control right of a plurality computer hosts will be no longer complicated or lousy.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for converting a KVM system comprising the steps of:
   (1) initializing a mouse device, at least two computer hosts, a keyboard, and at least two corresponding displaying devices;
   (2) selecting which computer host and a corresponding displaying device are needed to be operated, then switching to the selected computer host and the corresponding displaying device by controlling a switch disposed on the mouse into a particular direction; wherein step (2) further comprises the steps of:
      (2A) judging whether a first computer host is needed to be operated, if yes, going to step (2B), if no, going to step (2D);
      (2B) controlling the switch disposed on the mouse into a first direction corresponding to the use of the first computer host;
      (2C) operating the first computer host, then going to step (4);
      (2D) judging whether a second computer host is needed to be operated, if yes, going to step (2E), if no, going to step (2G);
      (2E) controlling the switch disposed on the mouse into a second direction corresponding to the use of the second computer host;
      (2F) operating the second computer host, then going to step (4); and
      (2G) continuing the steps of judging whether a third computer host, a fourth computer host, or other computer hosts, the steps being the same logic as the steps of (2A) to (2F), then going to step (4);
   (3) operating the selected computer host and the corresponding displaying device;
   (4) finishing the operation;
   (5) judging whether one of the computer hosts and another corresponding displaying device is needed to be operated, if yes, going to step (2), if no, going to next step; and
   (6) end.

2. The method for converting the KVM system according to claim 1, wherein one step can be added between step (2) and step (3) and is that of:
- (1A) judging whether a computer host and a corresponding displaying device are needed to be operated, wherein the computer host and the corresponding displaying device are being connected to the mouse device and the keyboard, if yes, going to next step, if no, going to step (2); and
- (1B) continuously operating the computer host and the corresponding displaying device, and then going to step (4).

3. The method for converting the KVM system according to claim 1, wherein the switch disposed on the mouse is a scrolling ball.

4. The method for converting the KVM system according to claim 1, wherein the switch disposed on the mouse is a scrolling reel.

5. The method for converting the KVM system according to claim 1, wherein the switch disposed on the mouse is a scrolling plate.

6. A method for converting a KM system comprising the steps of:
- (1) initializing a mouse device, at least two computer hosts, a keyboard, and a displaying device;
- (2) selecting which computer host is needed to be operated, then switching to the selected computer host by controlling a switch disposed on the mouse into a particular direction; wherein step (2) further comprises the steps of:
  - (2A) judging whether a first computer host is needed to be operated, if yes, going to step (2B), if no, going to step (2D);
  - (2B) controlling the switch disposed on the mouse into a first direction corresponding to the use of the first computer host;
  - (2C) operating the first computer host, then going to step (4);
  - (2D) judging whether a second computer host is needed to be operated, if yes, going to step (2E), if no, going to step (2G);
  - (2E) controlling the switch disposed on the mouse into a second direction corresponding to the use of the second computer host;
  - (2F) operating the second computer host, then going to step (4); and
  - (2G) continuing the steps of judging whether a third computer host, a fourth computer host, or other computer hosts, the steps being the same logic as the steps of (2A) to (2F), then going to step (4);
- (3) operating the selected computer host;
- (4) finishing the operation;
- (5) judging whether one of the computer hosts is needed to be operated, if yes, going to step (2), if no, going to next step; and
- (6) end.

7. The method for converting the KM system according to claim 6, wherein one step can be added between step (2) and step (3) and is that of:
- (1A) judging whether a computer host is needed to be operated, wherein the computer host is being connected to the mouse device, the keyboard and the displaying device, if yes, going to next step, if no, going to step (2); and
- (1B) continuously operating the computer host, and then going to step (4).

8. The method for converting the KM system according to claim 6, wherein the switch disposed on the mouse is a scrolling ball.

9. The method for converting the KM system according to claim 6, wherein the switch disposed on the mouse is a scrolling reel.

10. The method for converting the KM system according to claim 6, wherein the switch disposed on the mouse is a scrolling plate.

* * * * *